United States Patent [19]
Golz

[11] Patent Number: 5,683,175
[45] Date of Patent: Nov. 4, 1997

[54] LENTICULATED LENS

[75] Inventor: Thomas M. Golz, Willoughby Hills, Ohio

[73] Assignee: General Electric Company, Schenectady, N.Y.

[21] Appl. No.: 376,638

[22] Filed: Jan. 23, 1995

Related U.S. Application Data

[63] Continuation of Ser. No. 976,794, Nov. 16, 1992, Pat. No. 5,442,252.

[51] Int. Cl.$^6$ ........................................ F21V 5/00
[52] U.S. Cl. .................... 362/338; 362/309; 362/328; 362/332; 313/111; 313/116; 359/619; 359/626
[58] Field of Search ........................ 362/309, 326, 362/328, 332, 335, 336, 338; 313/111, 113, 116; 359/619, 621, 626

[56] References Cited

U.S. PATENT DOCUMENTS

| | | | |
|---|---|---|---|
| 3,267,278 | 8/1966 | Doolittle | 362/309 |
| 4,484,254 | 11/1984 | Puckett et al. | 362/338 X |
| 4,494,176 | 1/1985 | Sands et al. | 362/309 X |
| 4,545,007 | 10/1985 | Nagel | 362/338 X |
| 4,651,261 | 3/1987 | Szekacs | 362/336 X |
| 4,785,385 | 11/1988 | Holst | 362/309 |
| 4,912,613 | 3/1990 | Sanborn | 362/309 X |
| 4,991,073 | 2/1991 | Levin | 362/336 X |
| 5,032,963 | 7/1991 | Granstrom | 362/309 X |
| 5,043,856 | 8/1991 | Levin | 362/338 X |
| 5,442,252 | 8/1995 | Golz | 362/309 X |

*Primary Examiner*—Stephen F. Husar
*Attorney, Agent, or Firm*—George E Hawranko

[57] ABSTRACT

A lenticular lens containing a multiplicity of multi-sided lenticules useful with reflector lamps provides improved light distribution by having the lenticules oriented to avoid parallelism with a projected light image and distributed in a plurality of zones or bands concentric about said optical center. The size and light-spreading ability of the lenticules in each zone is selected to provide the desired light distribution. Parallelism is avoided by having the lenticules arrayed in a plurality of wedge-shaped sections circumferentially arranged in a circle around the optical center of the lens and extending through the zones with the lenticules in each section arrayed in a uniform, close-packed hexagonal array of parallel rows with the longitudinal axis of one of the rows being radially aligned with respect to the optical center of the lens, so that none of the sides of the lenticules are parallel to the light source image projected off the reflector.

9 Claims, 3 Drawing Sheets ing improved
LENTICULATED LENS

This is a continuation of application Ser. No. 07/976,794, filed Nov. 16, 1992, now U.S. Pat. No. 5,442,252.

BACKGROUND OF THE INVENTION

1. Field of the Invention

This invention relates to a lenticular lens having improved light distribution. More particularly, this invention relates to a lenticular lens and its use with electric lamps, said lens having multi-sided lenticules (i) contained in a plurality of sections circumferentially arranged in a circle around the optical center of the lens, with the lenticules in each section oriented to reduce or avoid parallelism and (ii) arranged in a plurality of zones concentric around the optical center of the lens with the size and light spreading ability of the lenticules in each zone selected to provide a uniform light distribution over the desired light beam pattern.

2. Background of the Disclosure

Exterior and interior lights such as flood and spotlights include an electric light source mounted within a reflector which is covered with a lens to break up the light source image and redirect the reflected light to the desired beam pattern to illuminate a particular zone or area. Uniform illumination is desired, but rarely achieved. The filament or arc discharge light source is three-dimensional and not a point source. This produces a light source image which must be broken up and diffused or eliminated by the lens. The lens type most commonly used and cheapest to manufacture for this purpose is a lenticulated lens made of light-transmissive glass or plastic containing a plurality of lenticules on the inner light receiving surface. These lenticules generally have a spherical or curved light entrance surface and terminate in a slightly curved or relatively flat exit surface. The lenticules are typically distributed across the lens in the form of a close packed, uniform, array of parallel rows and are therefore all of the same shape and size. In the case where the lenticules all have a spherical light-receiving surface, they are arranged in a close packed, uniform, hexagonal array of parallel rows. In theory, the spherical surface of the lenticules should produce a center weighted light distribution in the beam pattern with the light falling off smoothly in intensity toward the edge of the pattern. In fact this does not happen with lenses having lenticules in a uniform hexagonal array due to the physical properties of the glass, the lens molding process, the greater angular light bending strength in the corners of each lenticule and optical distortion at the edges of the hexagonal lenticules and the optical interaction of the hexagonal lenticules with the light source image reflected forward by the reflector into the lenticules. The uniform, close-packed hexagonal array of the hexagonally-shaped lenticules results in the same sides of all the lenticules being parallel. Each hexagonal-shaped lenticule produces a light beam having a hexagonal shaped perimeter, with the sides of the hexagonal perimeter being aligned with the sides of the lenticule. Since the same sides of all the lenticules are parallel, the hexagonal-shaped perimeter of the light beam projected forward through the lens is a summation of the hexagonal perimeter of the beams projected through all the lenticules. The light intensity of the straight sides of the hexagonal-shaped perimeter of the light pattern is exascerbated when a longitudinal light source image projected forward of the reflector is parallel to the sides of the lenticules. This is called "parallelism" and produces a light beam pattern which produces a light beam having a hexagonal perimeter which users refer to as the "hex pattern" and regard as objectionable.

By way of example, a close-packed hexagonal array of parallel rows of lenticules having a curved or spherical light-receiving surface distributed across the light-receiving side of a lens results in six different directions radially extending from the optical center of the lens to the optical edge of the lens, wherein the same side of each hexagonal lenticule is radially aligned parallel to the long axis of the light source images projected through the lenticules. This reinforces the filament or arc light source image projected in the six directions and produces the hexagonal-shaped light perimeter at the outer edge of the projected beam pattern. In the case of a circular lens, the beam pattern will be circular with a visibly discernible, hexagonal-shaped perimeter of light (hex pattern) around the outer edge of the beam pattern.

Furthermore, a light beam pattern is produced which the human eye perceives as light weighted in the center and edge of the pattern, with a lower level of light intensity in-between the center and edge. This gives a visual impression of a bright center surrounded by an apparent lower intensity light ring with a bright appearing light band or ring near the edge of the beam pattern. This ring of brighter or greater light intensity towards the edge is known as "the donut". Attempts to improve light distribution over the beam pattern have included a lenticular lens wherein the lenticules are aspherical in shape, with each lenticule divided into a plurality of coaxial zones and each zone having a different radius of curvature as disclosed in U.S. Pat. No. 4,545,007. Another attempted solution to the problem of non-uniform light distribution is disclosed in U.S. Pat. No. 5,043,856 as a mixture of spherical and aspherical lenticules uniformly distributed across the light-receiving surface of the lens. Random patterns such as shot stipple have also been tried.

SUMMARY OF THE INVENTION

This invention relates to a lenticular lens having or exhibiting reduced parallelism and which also reduces or eliminates the donut effect thereby producing improved light distribution and its use with electric lamps. A lens according to this invention has an optical center, an optical edge, a light-receiving side, a light-emitting side and a multiplicity of multi-sided lenticules having a light-receiving surface for dispersing and spreading light entering the light-receiving surface. The lenticules are oriented to avoid parallelism and are arranged in a plurality of zones or bands concentric around the optical center of the lens with the size and light-spreading ability of the lenticules in each zone selected to contribute to a uniform light distribution over the desired light beam pattern when the lens is used with a reflector lamp. Orienting the multi-sided lenticules on the lens to avoid parallelism may be achieved by having the lenticules contained in a plurality of sections circumferentially arranged around the optical center of the lens, with the orientation of the lenticules being the same in a particular section, but different in orientation from lenticules in other sections. Further arranging the lenticules in a plurality of zones or bands essentially concentric about the optical center, with the size and light-spreading ability of the lenticules in each zone selected to provide or contribute to a more uniform light distribution over the desired light beam pattern helps to eliminate the donut effect. By plurality of zones is meant at least two and more preferably at least three. These zones go through the sections. In one embodiment the lenticules are distributed over the light-receiving side of the lens in a plurality of wedge-shaped sections circumferentially arranged around the optical center of the lens. The lenticules in each wedge-shaped section are distributed in a close-packed array of parallel rows whose longitudinal axis is oriented to reduce or avoid the sides of the lenticules from being parallel to the light image projected through each lenticule. In this arrangement, the close-packed hexagonal array of parallel rows in each section extends through the zones in each section, with the radius of the light-receiving surface of the lenticules being the same in a particular zone, but different from the radius of the lenticules in other zones. The optimum number of wedge-shaped sections is determined by the number of sides of the multi-sided lenticules and is generally equal to two or three times the number of such sides, depending on the particular shape. Thus, by way of example, the optimum number for triangular shaped lenticules is nine; for squares is eight or twelve, and for hexagons twelve.

Circular, light-transparent glass lenses have been made according to this invention having hexagonal-shaped lenticules contained in twelve wedge-shaped sections circumferentially arranged around the optical center of the lens in which there were four zones or bands concentric about the center which extended through all the sections. In each section the lenticules are arranged in a uniform, close-packed hexagonal array of parallel rows with the longitudinal axis of one of the rows in each section aligned radially from said optical center. Further, each section contains four zones in which the light-receiving spherical surface of the lenticules in the zone outermost from the optical center of the lens had the smallest radius, with the radius of the light-receiving surface of the lenticules in each successive zone increasing towards the optical center. Since the light-spreading ability of lenticules having a spherical light-receiving surface is inversely proportional to the lenticular radius, the lenticules in the outermost zone towards the optical edge of the lens having the smallest radius have the greatest light-spreading property while those in the zone nearest the optical center of the lens having the largest radius have the smallest light-spreading ability. Both of these lenses substantially reduced the donut effect when used on a reflector lamp.

When employed with a reflector lamp having an axially aligned filament light source these lenses have exhibited a substantially reduced donut effect and hexagonal perimeter around the edge of the projected light beam, compared to prior art lamps having the same size and shape lenticules arranged on the light-receiving side of the lens in a uniform, close-packed, hexagonal array of parallel rows extending across the light-receiving surface of the lens, so that all the lenticules on the lens had the same orientation and focal length.

DETAILED DESCRIPTION

Figure 1:
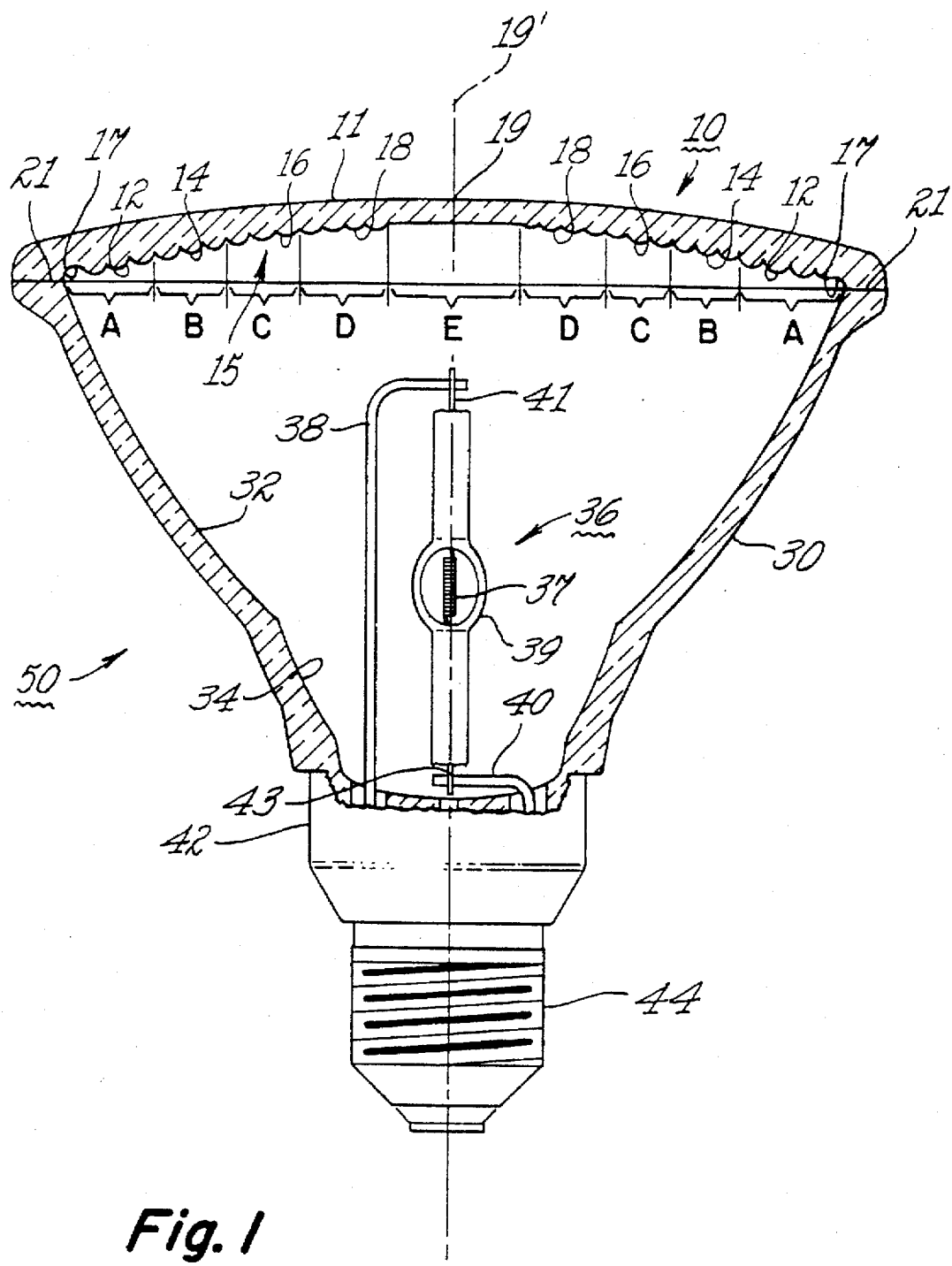
FIG. 1 schematically illustrates a reflector lamp having a lenticular lens of the invention.
Figure 3:
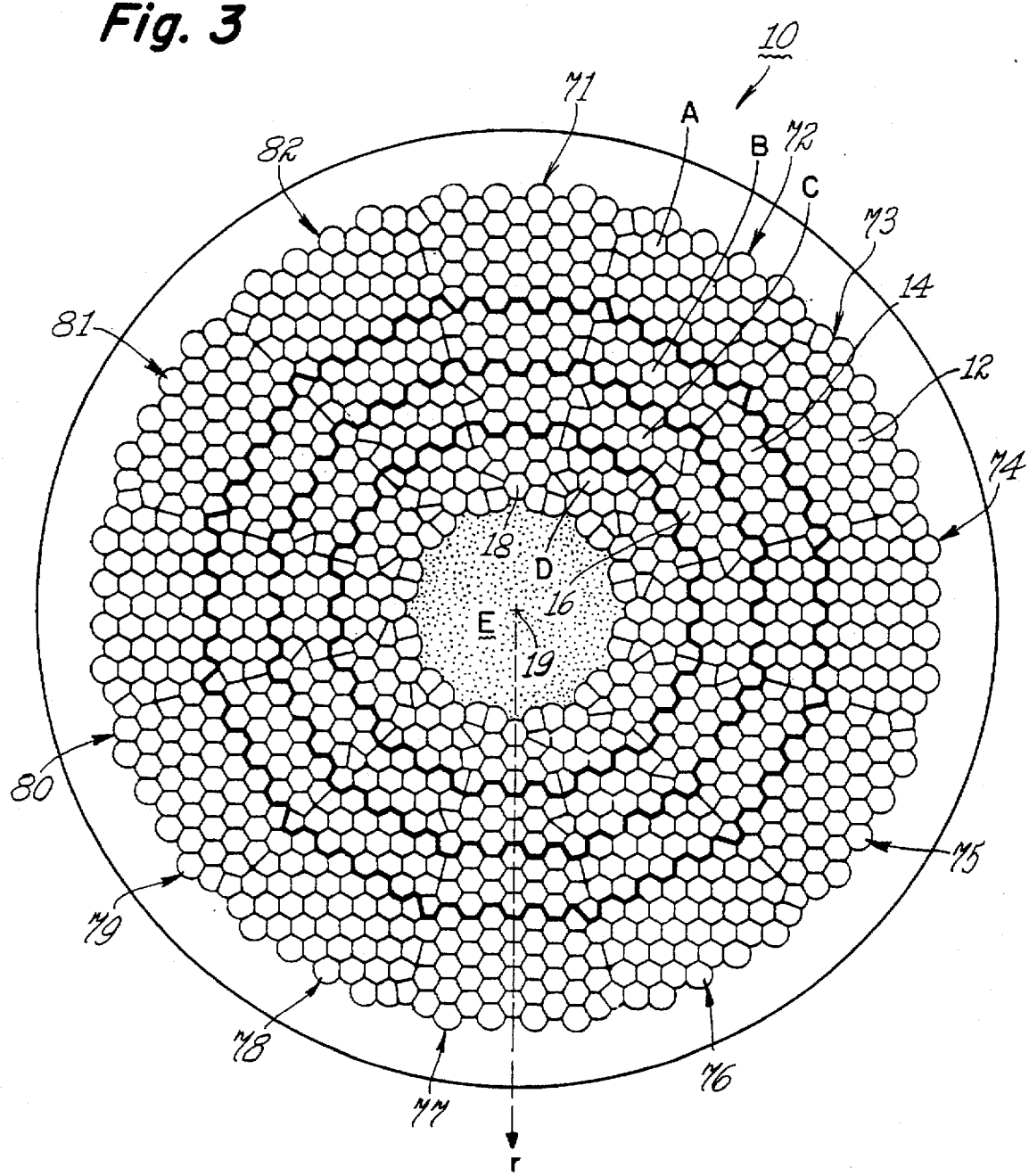
FIG. 3 illustrates the light-receiving side of a lens according to the invention.

FIG. 1 schematically illustrates a glass reflector lamp 50 according to the invention comprising a lenticular glass lens 10 of the invention sealed by cement or fusion at flat rim portion 21 to the forward light-projecting end of glass reflector 30 which terminates at its other end in a metal lamp base comprising collar 42 crimped onto the bottom (not shown) of the reflector and standard metal screw base 44. In the embodiment shown, glass reflector 30 has two metal-lized (i.e., aluminum) interior reflecting surfaces 32 and 34. A double-ended incandescent lamp 36 having a filament 37 supported within lamp envelope 39 of lamp 36 by means not shown is connected by outer leads 41 and 43 to metal support rods 38 and 40 which also serve to conduct electricity to the filament from attachments (not shown) to base portion 44. Lamp 36 has its longitudinal axis coincident with (or generally parallel to) the longitudinal axis of the lamp (assembly) 50 and transverse to the general plane of lens 10. Although lamp 36 is illustrated as a double-ended incandescent lamp, it could also be a single-ended incandescent lamp, an arc lamp, a filament, or a pair of electrodes with an arc-sustaining fill also enclosed within lamp 50. Lens 10 is illustrated as a portion of a surface of a circle and is of relatively uniform thickness. However, other embodiments of the lens shape such as a meniscus lens, plano-convex, double convex, etc., may be employed within the context of the invention. Lens 10 also has an optical edge or outer area 17 and an optical center 19. In the embodiment shown optical center 19 is the geometric center of the lens and is also coincident with the longitudinal axis 19' of the lamp 50. Flat rim portion 21 is provided to achieve a seal to reflector 30. The outside surface 11, which is the light-emitting or exiting side of the lens, is illustrated as being smooth. The light-receiving side 15 of lens 10 contains a multiplicity of lenticules which, in the embodiment of the invention illustrated in FIG. 3, are all hexagonally-shaped in the plane of the lens and all have the same hexagonal dimensions. In this embodiment, each lenticule has a spherically curved surface for receiving and dispersing or spreading the light emitted by the lamp and reflected forward through the lenticule by the reflector. The lenticules have four different radii 12, 14, 16 and 18, and are arranged in four respective zones A, B, C and D concentric around optical center 19 and extending through all of the sections. In the embodiment illustrated in FIGS. 1 and 3 the center portion E is stippled to provide a low spread visual contrast area for lettering and a logo which serve to identify the lens manufacturer. However, if desired, the lenticules could also extend to cover the center portion.

Figure 2A:
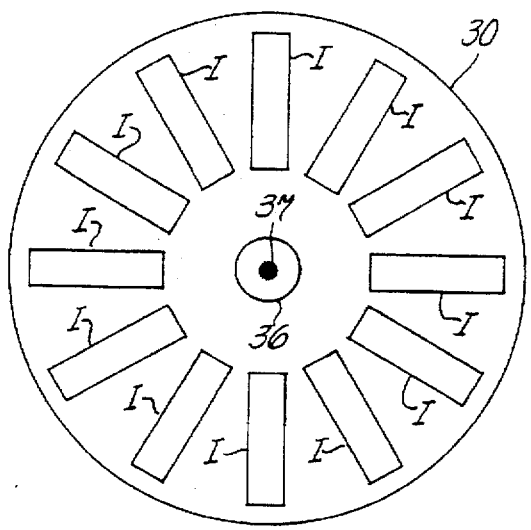
FIG. 2(a) schematically illustrates a view of a filament image projection.

FIG. 2(a) illustrates an imaginary, partial schematic view looking into reflector 30 containing lamp 36 and filament 37 axially aligned along 19' as illustrated in FIG. 1. An axially aligned filament in a reflector projects an infinite number of radial filament images, I, circumferentially aligned around the filament as illustrated in FIG. 2(a). This radial image orientation can actually be demonstrated by removing the lens from a reflector lamp as illustrated in FIG. 1 and covering the open, light-projecting end where the lens would be with a light opaque material having a small hole in it. Moving the hole circumferentially around the opening of the reflector produces a beam pattern of a single filament image in which the projected filament image appears radially aligned as shown in 2(a), with the location and size of the image depending on the position of the hole and its radial distance from the filament. In FIG. 2(a), twelve filament images equidistant (30°) from each other are illustrated for convenience.

Figure 2B:
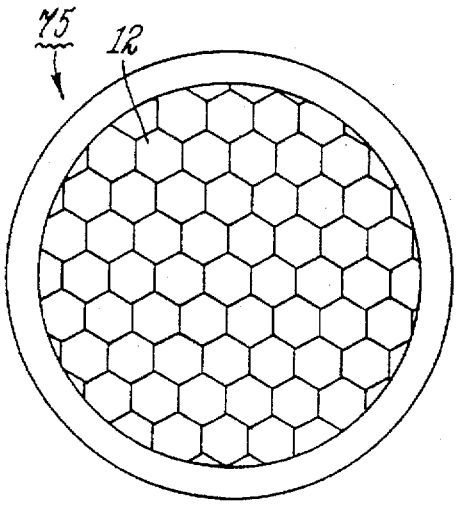
FIG. 2(b) schematically illustrates a prior art lenticular lens having uniform, hexagonal close-packed lenticules.
Figure 2C:
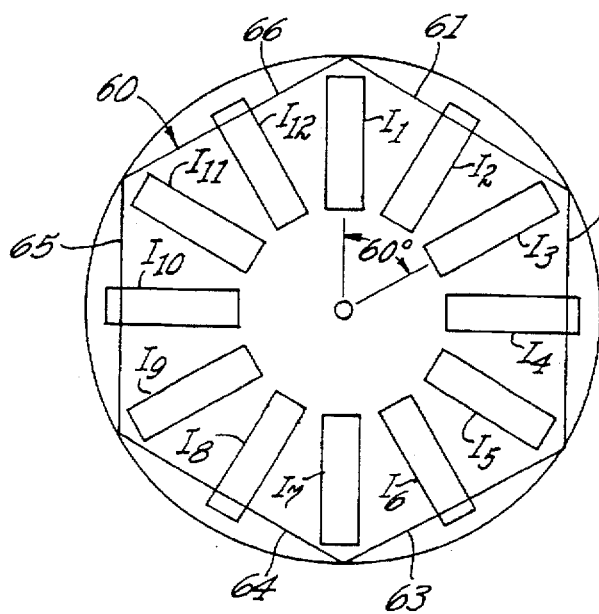
FIG. 2(c) illustrates a hexagonal lenticule superimposed over the filament image projection of FIG. 2(a).
Figure 2D:
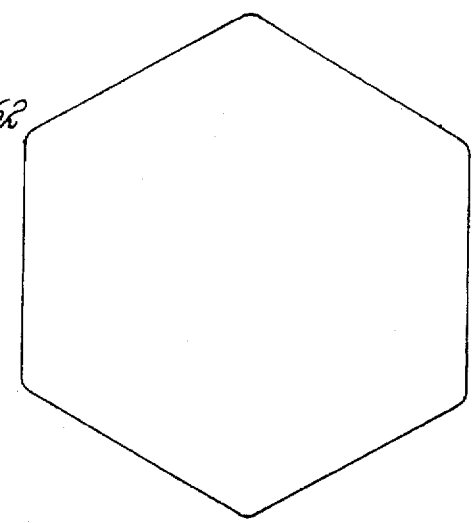
FIG. 2(d) illustrates the hexagonal light beam pattern resulting from a lens of 2(b) in combination with the radial filament image projection of 2(a).

FIG. 2(b) schematically illustrates a prior art lens 75 having a multiplicity of hexagonal-shaped lenticules 12, all of the same size and having a spherical light-receiving surface of the same radius (not shown), arranged in a uniform, close-packed, hexagonal array of parallel rows extending across the light-receiving surface of the lens which looks like a honeycomb. FIG. 2(c) illustrates the filament light image pattern of FIG. 2(a) which contains a hexagon to illustrate the filament light image hexagonal reinforcement produced by the hexagonal lenticules of the prior art lens of FIG. 2(b) to produce the circular light beam pattern of FIG. 2(d) having a hexagonal perimeter. According to elemental geometry and as illustrated in FIG. 2(c), each hexagonally-shaped lenticule has six sides in which opposing sides are parallel and each side is aligned at an angle of 60° from its nearest two neighbors. Accordingly, the six corresponding sides of all the lenticules will be aligned in a parallel and reinforcing fashion (parallelism) with the filament image of a longitudinal filament aligned with its longitudinal axis transverse to the plane of the lens as illustrated in FIG. 2(c). The image is projected in a parallel and reinforcing fashion where the image is coincident with the six sides of the hexagon to produce the hexagonal perimeter at the edge of the light beam as is shown in FIG. 2(d). By way of illustration, referring to FIG. 2(c), a hexagon 60 having six sides identified as 61 through 66 representing a hexagonal-shaped lenticule (lens) is shown within the projected filament image pattern of FIG. 2(a) and is oriented in the same manner as the hexagonal-shaped lenticules of the prior art lens illustrated in FIG. 2(b). Referring to FIG. 2(c), the longitudinal axis of filament images $I_1$ and $I_7$ are parallel to sides 62 and 65. The longitudinal axis of Images $I_3$ and $I_9$ are parallel to sides 63 and 66, while that of images $I_5$ and $I_{11}$ are parallel to sides 61 and 64. In all of these cases the parallel sides of the hexagonal-shaped lens or lenticule reinforces the parallel filament images. On the other hand, this parallelism does not exist for filament images $I_2$, $I_4$, $I_6$, $I_8$, $I_{10}$ and $I_{12}$. The sides of the lenticules tend to concentrate or reinforce those filament images whose longitudinal axes are parallel to the sides, the summation of which produces a light beam pattern having a six-sided perimeter of light as illustrated in FIG. 2(d). The hexagonal border or periphery of the projected light beam pattern corresponds and is parallel to the six sides of the lenticules.

FIG. 3 schematically illustrates a view of the light-receiving side 15 of a lens 10 according to the invention in which multi-sided (in the plane of the lens) lenticules are arrayed in a close-packed array of parallel rows, but which avoids the parallelism of the prior art lens of FIG. 2(b) by having the multi-sided lenticules arrayed in wedge-shaped sections 71 through 82 circumferentially arranged in a circle around the optical center 19 of lens 10 so that none of the sides of the lenticules is radially aligned so as to be parallel to the projected filament image. The lens is generally planar and shaped like a portion of the surface of a sphere. A side view of the lens in FIG. 3 is schematically illustrated in FIG. 1. The multi-sided lenticules in each wedge-shaped section are arrayed so that none of the sides are radially aligned with respect to the optical center of the lens which would tend to reinforce the light source image. In the embodiment shown, each section 71 through 82 is somewhat frustoconical in shape in not coming to a point at the small end in order to obtain the stippled area D in the center of the lens. As illustrated in FIG. 3, each section 71–82 contains a multiplicity of lenticules 12, 14, 16 and 18 which, except for edge effects, are all of the same hexagonal size and dimensions in the plane of the lens and are arranged in a uniform, close-packed, hexagonal array of parallel rows, with the longitudinal axis of the rows in each section parallel to each other and wherein the longitudinal axis of one of the rows is coincident to the radius of the circle in which the sections are circumferentially arranged around the optical center 19 of lens 10. The longitudinal axis of the middle row in each section is coincident with the radius of the circle in this embodiment. The lenticules are oriented so that none of the six sides of each lenticule in each section is parallel to the radius of the circle. This means that for a reflector lamp having an elongated light source axially mounted along the longitudinal reflector axis (or transverse to the plane of the lens), the longitudinal axis of the light source image radially projected by the reflector under each section of lenticules is not parallel to any edges of the lenticules in that section. This intentional arrangement avoids parallelism and also permits the corners of the lenticules to soften the image reinforcement that would have occurred if parallelism had existed.

In FIG. 3, each of the twelve wedge-shaped sections is illustrated as having a uniform, close-packed array of hexagonal-shaped lenticules 12 all of the same size and arranged in parallel rows wherein the longitudinal axis of one of the rows in each section (the middle row in the embodiment shown) is radially aligned coincident with the radius r with respect to the optical center of the lens as illustrated for section 77. This means that all of the rows in each section are parallel to the radius coincident with the longitudinal axis of the middle row and, in the honeycomb pattern of the hexagonal-shaped lenticules, insures that none of the six sides of any of the lenticules is radially aligned (coincident with) about the optical center or parallel to a radius from the optical center. Hence, the parallelism of the prior art lens is thereby avoided. As set forth above, having twelve equal sections as shown in FIG. 3 is the optimum number of sections for avoiding parallelism with hexagonal-shaped lenticules arranged in a uniform, close-packed array of parallel rows. In the embodiment of FIG. 3 the lenticules in each particular section have the same orientation as all the other lenticules in that section. The lenticules in every other segment have the same orientation.

The four different radiused lenticules 12, 14, 16 and 18 are arranged in four essentially concentric areas or zones A, B, C and D, respectively, which are illustrated in FIG. 3. All of the lenticules in zone A have the same radius which is different from the radius of the lenticules in zones B, C and D. Similarly, all of the lenticules in zone B have the same radius which is different from the radius of the lenticules in zones A, C and D. The radius of all the lenticules in zone C is the same which is different from the radius of the lenticules in zones A, B and D, while the radius of the lenticules in zone D are all the same, but different from zones A, B and C.

In the embodiment shown in FIGS. 1 and 3, the lenticules in zone A all have a radius smaller than the radius of the lenticules in zone B which, in turn, all have a radius smaller than the radius of the lenticules in zone C. All of the lenticules in zone C have a radius smaller in size than the radius of the lenticules in zone D, with all the lenticules in zone D having the largest radius. Thus, the radius of the lenticules in zone A which is outermost from the optical center 19 and nearest to the optical edge 17 of lens 10 is the smallest, with the radius of the lenticules increasing as one passes from zone to zone towards the center of lens 10. Also, in this embodiment the four lenticulated zones A, B, C and D are illustrated as being adjacent and sequential.

The optical considerations involved for a reflector lamp such as that illustrated in FIG. 1 having a filament at the focal point of a parabolic reflector are such that the angular width of the reflected filament image projected forward of the reflecting surface decrease with increasing distance from the filament or other light source. This decrease is a function of the inverse of the distance from the light source to the reflecting surface. This results in a decrease in the size of the forward reflected light source image from the center to the edge of the reflector or lens which, combined with the distortions in the edges of the lenticules due to the physical vagaries of the real world, results in a reflected light beam pattern which has a non-uniform light distribution from the center to the edge, either real or perceived by the viewer, or both. The lens of the invention corrects this by varying the focal length of the lenticules dependent on the light source or filament image width projected forward of the reflecting surface through the lenticules and the lens distortion effects so that the summation of donuts from each zone do not reinforce a strong visual edge, but smooth the projected light distribution. The most ideal solution would be to have the lenticules on the lens vary continuously according to the requirements dictated by the desired light beam pattern, the shape and size of the reflector and the shape and size of the light source. However, it is too costly to be practicable to machine a die for manufacturing such a lens. Thus, the lens of the invention is a compromise solution which has been found to be both optically effective and reasonably economical.

All of the hexagonal-shaped (in the plane of the lens) lenticules illustrated in the embodiment in FIG. 3 are shown as being of the same dimensions as measured in the plane of the lens in order to achieve the uniform close-packed array of parallel rows. Those skilled in the art will appreciate that in order to achieve this, the protrusion or height of the lenticules 12 in zone A, which have the smallest radius, is greater than that of lenticules 14 in zone B which have a radius larger than those in zone A. Lenticules 14 in zone B in turn protrude more than those in zone C in which the radius of the lenticules 14 is greater than in zone B, etc.

Actual lenses of the invention have been pressed from glass having the characteristics of FIGS. 1 and 3 having an overall diameter of about 4¾ inches (including the rim portion) with the diameter of the lenticule portion being 4⅜ inches except for the stippled central portion which was about 1 inch in diameter. Each wedge-shaped section included an angle of 30° and contained 85 lenticules for a total of 1020 lenticules on the lens. The lenticules all had a spherical light-receiving surface, with the radii in zones A, B, C and D being 0.095 inch, 0.92 inch, 0.125 inch and 0.182 inch, respectively. Broken into zones, there were 40 lenticules per section in zone A, 18 in zone B, 14 in zone C and 13 in zone D. The hexagons were all (except for edge effects at borders) about ⅛ inch long. Employing these lenses, as illustrated in FIG. 3, with a lamp having a filament light source as illustrated in FIG. 1, substantially reduced both the donut effect and the hex pattern compared to a prior art lens of the same size and having hexagonal shaped lenticules of ⅛ inch hexagonal dimension all having a ⅛ inch radius, spherical light-receiving surface arrayed in a uniform, close-packed hexagonal pattern as illustrated in FIG. 2(b).

In the embodiment above, each section is wedge-shaped, all sections are the same size and adjacent to two other sections, with the lenticules all of the same size and shape both within each section and in all sections. The four zones are also sequential and extend through all of the sections However, the above embodiment is intended to be illustrative, but non-limiting with respect to the invention. Thus, the lenticules could be different sizes and shapes such as the triangular and square (in the plane of the lens) multi-sided shapes mentioned above and the light-receiving surface may be spherical or an aspherical curved surface or cone-shaped, pyramid-shaped, etc., or contain a multiplicity of shapes and sizes within the same section. The circumferential sections also can be different shapes and sizes depending on the particular application, and do not necessarily have to be adjacent or wedge-shaped, the choice being left to the practitioner. The essence of the invention is the avoidance or reduction of the parallelism of the multi-sided lenticules to the light source image for the particular application of the lens by lenticule orientation, and reduction of the donut effect by the use of a plurality of zones permitting other modifications of the light-dispersing properties of the lens. For example, a lamp having a light source transverse to the lamp axis or generally parallel to the plane of the lens, will produce light source images having a longitudinal axis not radially oriented about the source as illustrated in FIG. 2(a) in some regions of the reflector. The orientation of the multi-sided lenticules on a lens of the invention for such an application will have to be adjusted according to the light source image projection at different portions to avoid parallelism by avoiding or minimizing alignment of any of the lenticule sides parallel to the projected light source image.

The foregoing embodiments are intended to be illustrative, but non-limiting with respect to the practice of the invention. Some departure from these embodiments is permissible within the scope of the invention as those skilled in the art will know and appreciate.

What is claimed is:

1. A lenticular lens comprising an optical center, an optical edge, a light-receiving side and a light-transmitting side and containing a plurality of lenticules having multiple sides on said light-receiving side wherein said lenticules are arranged in a plural number of wedge-shaped sections circumferentially arranged around said optical center of said lens, the number of sections being at least twice the number of sides of the lenticules and wherein said lenticules are arranged in each said section in a uniform, close-packed hexagonal array of parallel rows with the longitudinal axis of one of said rows in each said section aligned with a radius extending from said optical center, said lenticules further having a curved light-receiving surface.

2. A lens according to claim 1 in which said lenticules have a hexagonal shape in the plane of said lens.

3. A lens according to claim 2 in which said lenticules have a spherical light-receiving surface.

4. A lens according to claim 3 wherein none of said sides of said lenticules are radially aligned from said optical center of said lens.

5. A lens according to claim 1 wherein said wedge-shaped sections are disposed sequentially and adjacent to one another.

6. A lens according to claim 1 wherein the lenticules are arranged in a plurality of zones or bands concentric around the optical center of said lens, the light dispersing ability of each zone becoming progressively greater toward the outermost edges of said lens, and oriented to avoid parallelism when used to disperse light from a light source into a desired beam pattern.

7. A lens according to claim 1 wherein said lenticules are arranged in a plurality of zones or bands concentric around said optical center, the light dispersing ability of each zone becoming progressively greater toward the outermost edges of said lens, wherein at least a portion of said lenticules are oriented to reduce parallelism.

8. A lens according the claim 7 wherein said lenticules in each said zone are of substantially the same size and have essentially the same light-spreading ability.

9. A lens according to claim 1 wherein at least a portion of said lenticules have a curved, light-receiving surface.

* * * * *